United States Patent
Xu

(10) Patent No.: US 7,556,757 B2
(45) Date of Patent: Jul. 7, 2009

(54) METHOD FOR PREPARING A BIODEGRADABLE COMPOSITION FOR THE PREPARATION OF TABLEWARE, DRINK CONTAINER, MULCHING FILM AND PACKAGE

(76) Inventor: Hao Xu, Room 902, Building 4, Nanxinyuan, Nanxin Road, Nanshan District, Shenzhen, Guangdong (CN)

( * ) Notice: Subject to any disclaimer, the term of this patent is extended or adjusted under 35 U.S.C. 154(b) by 0 days.

(21) Appl. No.: 12/116,222

(22) Filed: May 7, 2008

(65) Prior Publication Data
US 2008/0203606 A1 Aug. 28, 2008

Related U.S. Application Data

(60) Division of application No. 11/418,628, filed on May 6, 2006, now Pat. No. 7,402,618, which is a continuation-in-part of application No. 10/432,813, filed as application No. PCT/CN01/01581 on Nov. 23, 2001, now abandoned.

(30) Foreign Application Priority Data
Nov. 23, 2000 (CN) .............................. 00 1 33318

(51) Int. Cl.
*D01D 5/40* (2006.01)
*B29C 47/00* (2006.01)
*B27K 5/00* (2006.01)
*C08K 11/00* (2006.01)
*C08L 97/00* (2006.01)
*C08L 3/00* (2006.01)
*C08L 89/00* (2006.01)
*D21H 19/54* (2006.01)
*C09D 17/00* (2006.01)

(52) U.S. Cl. .......................... 264/140; 524/13; 524/15; 524/16; 524/47; 524/425

(58) Field of Classification Search ................... 524/13, 524/15, 16, 47, 425; 264/140
See application file for complete search history.

(56) References Cited

U.S. PATENT DOCUMENTS

| 3,921,333 | A | * | 11/1975 | Clendinning et al. | ........... 47/74 |
| 4,287,103 | A | * | 9/1981 | Green et al. | .................. 524/47 |
| 4,316,745 | A | * | 2/1982 | Blount | .................. 106/287.34 |
| 4,337,181 | A | * | 6/1982 | Otey et al. | .................. 523/128 |
| 4,480,061 | A | * | 10/1984 | Coughlin et al. | .............. 524/13 |
| 4,483,950 | A | * | 11/1984 | Fanta et al. | .................... 524/48 |
| 4,983,651 | A | * | 1/1991 | Griffin | ......................... 524/47 |

(Continued)

*Primary Examiner*—Mark Eashoo
*Assistant Examiner*—Liam J Heincer

(57) ABSTRACT

The present invention relates to a biodegradable composition for the preparation of table-ware, mulching film and package, which comprises: 2-6% by weight of starch; 35-45% by weight of plant powders; 20-30% by weight of calcium carbonate; 2-7% by weight of sorbitol; 7-13% by weight of polypropylene; 2-5% by weight of polyethylene; 2-6% by weight of coupling agent; 1-2% by weight of defoamer; 2-5% by weight of stearic acid; 2-6% by weight of stearate; 3-6% by weight of glycerine or epoxidized soybean oil; and 60-100 ppm photosensitizer. The present invention also relates to a method for preparing the composition, which comprises: treating a plant waste with a diluent acid, drying and pulverizing, then mixing it with starch, polypropylene, and polyethylene, sorbitol, defoamer, coupling agent, stearic acid, stearate, glycerine and photosensitizer homogeneously; and blending the mixture obtained in a double-screw extruder at a temperature of 160-180° C. to obtain the composition of the present invention.

10 Claims, 1 Drawing Sheet

U.S. PATENT DOCUMENTS

Figure 1:
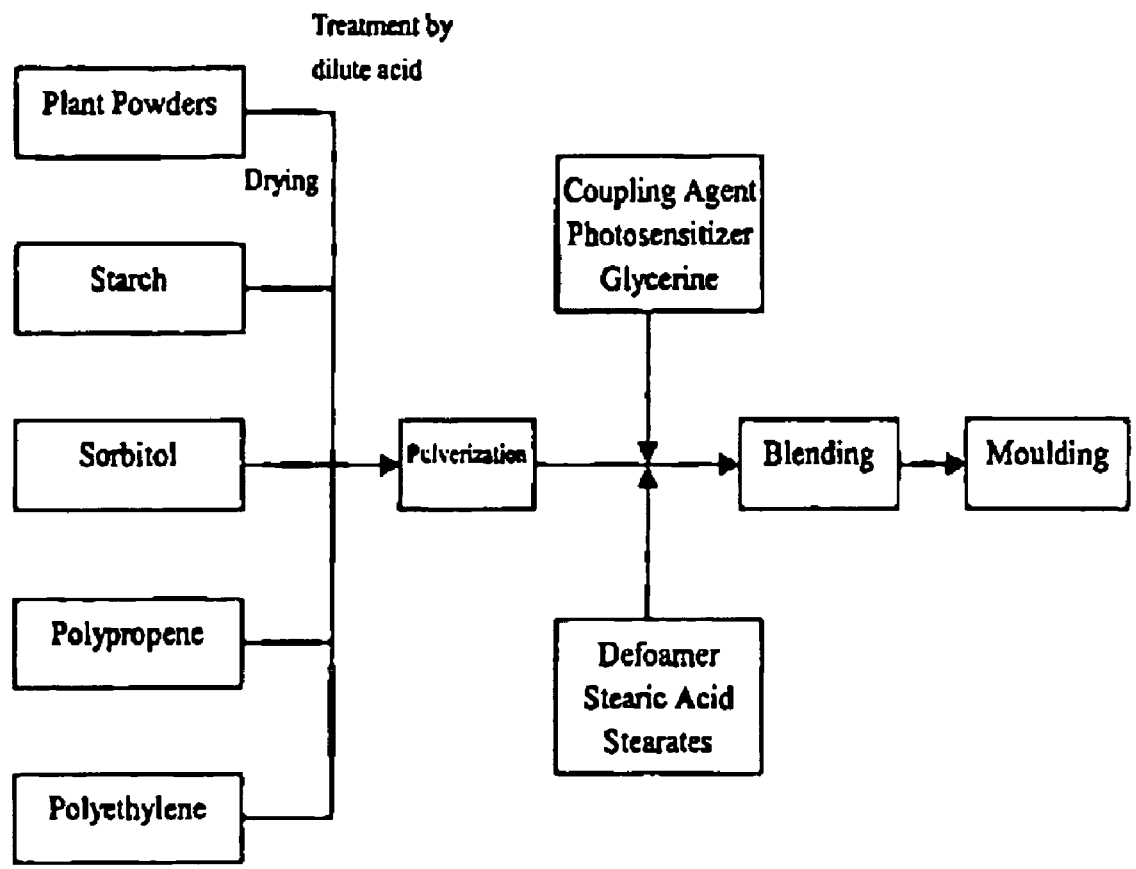

| | | | |
|---|---|---|---|
| 5,026,745 A * | 6/1991 | Weil | 524/47 |
| 5,026,746 A * | 6/1991 | Floyd et al. | 524/50 |
| 5,095,054 A * | 3/1992 | Lay et al. | 524/47 |
| 5,115,000 A * | 5/1992 | Jane et al. | 524/47 |
| 5,118,725 A * | 6/1992 | Suominen | 523/122 |
| 5,587,412 A * | 12/1996 | Borchers et al. | 524/47 |
| 5,681,873 A * | 10/1997 | Norton et al. | 523/115 |
| 5,703,160 A * | 12/1997 | Dehennau et al. | 525/54.24 |
| 5,719,203 A * | 2/1998 | Thobor | 523/128 |
| 5,739,244 A * | 4/1998 | Fisk | 524/47 |
| 5,773,495 A * | 6/1998 | Haschke et al. | 524/52 |
| 5,821,286 A * | 10/1998 | Xu et al. | 524/47 |
| 5,854,304 A * | 12/1998 | Garcia et al. | 523/124 |
| 5,874,486 A * | 2/1999 | Bastioli et al. | 523/128 |
| 5,993,530 A * | 11/1999 | Tanaka et al. | 106/206.1 |
| 6,051,359 A * | 4/2000 | Ohkawa et al. | 430/203 |
| 6,069,196 A * | 5/2000 | Akao et al. | 524/424 |
| 6,099,892 A * | 8/2000 | Masden et al. | 427/4 |
| 6,117,925 A * | 9/2000 | Tomka | 524/47 |
| 6,231,970 B1 * | 5/2001 | Andersen et al. | 428/332 |
| 6,235,815 B1 * | 5/2001 | Loercks et al. | 524/47 |
| 6,235,816 B1 * | 5/2001 | Lorcks et al. | 524/47 |
| 6,274,652 B1 * | 8/2001 | Uryu et al. | 524/27 |
| 6,632,862 B2 * | 10/2003 | Willett et al. | 524/13 |
| 6,756,422 B1 * | 6/2004 | Mochizuki et al. | 523/122 |
| 6,756,428 B2 * | 6/2004 | Denesuk | 524/47 |
| 6,844,380 B2 * | 1/2005 | Favis et al. | 524/52 |
| 6,958,369 B2 * | 10/2005 | Berger et al. | 524/47 |
| 7,071,249 B2 * | 7/2006 | Ho et al. | 524/39 |
| 7,094,817 B2 * | 8/2006 | Halley et al. | 524/47 |
| 2002/0188041 A1 * | 12/2002 | Bond et al. | 524/47 |
| 2003/0092793 A1 * | 5/2003 | Liu et al. | 523/124 |
| 2003/0216492 A1 * | 11/2003 | Bowden et al. | 524/47 |
| 2004/0082678 A1 * | 4/2004 | Xu | 522/1 |
| 2004/0122135 A1 * | 6/2004 | Halley et al. | 524/47 |

* cited by examiner

METHOD FOR PREPARING A BIODEGRADABLE COMPOSITION FOR THE PREPARATION OF TABLEWARE, DRINK CONTAINER, MULCHING FILM AND PACKAGE

CROSS REFERENCE TO RELATED APPLICATIONS

This application is divisional application of U.S. patent application Ser. No. 11/418,628, filed May 6, 2006 now U.S. Pat. No. 7,402,618, which is continuation-in-part (CIP) of U.S. patent application Ser. No. 10/432,813, filed Dec. 29, 2003 now abandoned, which is the National Phase of the International Patent Application No. PCT/CN01/01581 filed Nov. 23, 2001, which is based on Chinese Patent Application No. 00133318.6, filed Nov. 23, 2000.

FIELD OF THE INVENTION

The present invention relates to a biodegradable composition and a method for preparing the same. In particular, the present invention relates to a biodegradable composition for the preparation of tableware, drink containers, mulching film and packages, and a method for preparing the same.

BACKGROUND OF THE INVENTION

With the development of modem industry, especially the rapid development of petroleum chemical engineering, many synthetic resins and plastic articles with good properties and low costs have been provided for industrial and agricultural production. The use of plastic film, foamed plastic articles (for example, package materials, etc) and plastic sheets in many fields has greatly promoted industrial and agricultural production and has enriched people's daily lives. However, after use, this plastic waste is usually abandoned and discarded on the ground, in rivers, in mountains, in the streets and in parks. This seriously pollutes the environment, producing one of the most harmful types of environmental pollution: "white pollution." In recent years, many countries have made laws to restrict the use of plastic films and foamed plastics in order to reduce "white pollution." In addition, great efforts have been made to develop various kinds of degradable resins and plastic articles.

With today's fast-paced lifestyle, many people favor the convenience of snack foods more and more. These snack foods require a lot of tableware and drink containers, which, in the past, have been made of foamed plastics that are harmful to human body and the environment at high temperatures. These foamed plastics are now prohibited, and people have tried producing tableware and drink containers using other, less harmful materials. People have tried producing paper tableware and paper drink containers as an alternative to foamed plastics, but these paper containers have complex production procedures and high costs. People have also tried to use plastics material and modified starch (instead of foamed plastic) to produce the tableware and drink containers for snack foods, but the plastics material and modified starch have low biodegradability, high costs and possible secondary pollution.

Similarly, plastic films, foamed plastic articles (for example, package materials, etc) and plastic sheets (extruded sheet products) have the same problems as the tableware and drink containers made from paper and plastics material and modified starch.

OBJECTS OF THE INVENTION

One object of the present invention is to overcome the disadvantages of the prior art and to provide a biodegradable composition. In particular, an object of the present invention is to provide a biodegradable composition that can be used for the preparation of tableware, drink containers, mulching films and packages.

Another object of the present invention is to provide a method for preparing the biodegradable composition. In particular, an object of the present invention is to provide a biodegradable composition that can be used in the preparation of tableware, drink containers, mulching films and packages.

THE BRIEF DESCRIPTION OF THE DRAWING

FIG. 1 shows the flow chart of the method of the present invention for preparing the biodegradable composition for the preparation of tableware, drink containers, mulching films and packages.

SUMMARY OF THE INVENTION

According to one aspect of the invention, it provides a biodegradable composition for the preparation of tableware, drink containers, mulching films and packages, which comprises:
2-6% by weight of starch;
35-45% by weight of plant powders;
20-30% by weight of calcium carbonate;
2-7% by weight of sorbitol;
7-13% by weight of polypropylene;
2-5% by weight of polyethylene;
2-6% by weight of coupling agent;
1-2% by weight of defoamer;
2-5% by weight of stearic acid;
2-6% by weight of stearate;
3-6% by weight of glycerine; and
60-100 ppm photosensitizer.

According to another aspect of the present invention, it provides a method for preparing the biodegradable composition for the preparation of tableware, drink containers, mulching films and packages, which comprises:

(1) treating one or more plant wastes selected from the group consisting of sugar cane residue, peanut shell, dry pine needle, rice husk, millet bran and soybean shell in a 0.2-1.0% by weight of sulfuric acid or hydrochloric acid solution for 2-10 hours to degrease and modify and to wash, and then drying the same to let it have a water content of less than 10%; mixing the obtained plant wastes with starch, sorbitol, polypropylene, and polyethylene, and pulverizing the obtained mixture to obtain a powder with a particle size of larger than 70 mesh; mixing the obtained powder with calcium carbonate, stearic acid, stearate, coupling agent, defoamer, glycerine or epoxidized soybean oil, and photosensitizer homogeneously;

(2) blending the mixture obtained in step (I) in a double-screw extruder at a temperature of 160-180° C. to obtain the composition of the present invention.

DETAILED DESCRIPTION OF THE INVENTION

With the increasing care for the environment, the demand for biodegradability of plastic articles, such as tableware, drink containers, mulching films and packages, is increasing.

The present invention provides a biodegradable composition for the preparation of tableware, drink containers, mulching films and packages, which comprises:
 2-6% by weight of starch;
 35-45% by weight of plant powders;
 20-30% by weight of calcium carbonate;
 2-7% by weight of sorbitol;
 7-13% by weight of polypropylene;
 2-5% by weight of polyethylene;
 2-6% by weight of coupling agent;
 1-2% by weight of defoamer;
 2-5% by weight of stearic acid;
 2-6% by weight of stearate;
 3-6% by weight of glycerine or epoxidized soybean oil; and
 60-100 ppm photosensitizer.

According to the composition of the present invention, it preferably comprises:
 3-5% by weight of starch;
 35-40% by weight of plant powders;
 20-30% by weight of calcium carbonate;
 4-6% by weight of sorbitol;
 8-11% by weight of polypropylene;
 3-4% by weight of polyethylene;
 3-5% by weight of coupling agent;
 1-2% by weight of defoamer;
 3-4% by weight of stearic acid;
 3-5% by weight of stearate;
 3-5% by weight of glycerine or epoxidized soybean oil; and
 60-100 ppm photosensitizer.

According to the composition of the present invention, it more preferably comprises 3% by weight of starch; 37% by weight of plant powders; 25% by weight of calcium carbonate; 5% by weight of sorbitol; 9% by weight of polypropylene; 3% by weight of polyethylene; 5% by weight of coupling agent; 4% by weight of stearic acid; 4% by weight of stearate; 1% by weight of defoamer; 4% by weight of glycerine and 60 ppm photosensitizer.

According to the composition of the present invention, the starch includes corn starch, potato starch, ipomoea batatas starch, cassaya starch and their modified starch with a grain size of larger than 70 mesh.

According to the composition of the present invention, the plant powder is the powder of one or more plants in sugar cane residue, peanut shell, dry pine needle, rice husk, millet bran and soybean shell.

According to the composition of the present invention, the calcium carbonate is light or heavy calcium carbonate with a grain size of larger than 70 mesh.

According to the composition of the present invention, the coupling agent is that known by the skilled person in the art, and is preferably silane.

According to the composition of the present invention, the photosensitizer is that known by the skilled person in the art, and is preferably benzophenone.

According to the composition of the present invention, the defoamers are those known by the skilled person in the art, and is preferably emulsified silicone oil.

According to the composition of the present invention, the stearate is iron stearate, magnesium stearate or calcium stearate, and is preferably iron stearate.

According to another aspect of the invention, there provides a method for preparing the biodegradable composition for the preparation of table-ware, mulching film and package, which comprises:

(1) treating one or more plant wastes selected from the group consisting of sugar cane residue, peanut shell, dry pine needle, rice husk, millet bran and soybean shell in a 0.2-1.0% by weight of sulfuric acid or hydrochloric acid solution for 2-10 hours to degrease and modify and to wash, and then drying the same to let it have a water content of less than 10%; mixing the obtained plant wastes with starch, sorbitol, polypropylene, and polyethylene, and pulverizing the obtained mixture to obtain a powder with a particle size of larger than 70 mesh; mixing the obtained powder with calcium carbonate, stearic acid, stearate, coupling agent, defoamer, glycerine or epoxidized soybean oil, and photosensitizer homogeneously;

(2) blending the mixture obtained in step (1) in a double-screw extruder at a temperature of 160-180° C. to obtain the composition of the present invention.

According to the method of the present invention, the starch includes corn starch, potato starch, ipomoea batatas starch, cassaya starch and their modified starch with a grain size of larger than 70 mesh.

According to the method of the present invention, the plant powder is the powder of one or more plants in sugar cane residue, peanut shell, dry pine needle, rice husk, millet bran and soybean shell.

According to the method of the present invention, the calcium carbonate is light or heavy calcium carbonate with a grain size of larger than 70 mesh.

According to the method of the present invention, the coupling agent is that known by the skilled person in the art, and is preferably silane.

According to the method of the present invention, the photosensitizer is that known by the skilled person in the art, and is preferably benzophenone.

According to the method of the present invention, the defoamers are those known by the skilled person in the art, and is preferably emulsified silicone oil.

According to the method of the present invention, the stearate is iron stearate, magnesium stearate or calcium stearate, and preferably iron stearate.

The composition of the present invention can be widely used in various plastic articles, such as plastic film, foamed plastic articles (for example, package materials, etc), plastic sheets, the tableware and drink containers for snack foods and so on. When the composition is used in other plastic articles, the quantity and the selection of additional materials may be required, as will be known to the skilled in the art. For example, when the composition is used to prepare plastic films, such as agricultural films or packages, the plastic ingredient is usually polyethylene. The ratio of the plastic ingredient and composition of the present invention can vary between 30~70:70~30 by weight according to the requirements of the final product. Similarly, when the composition is used to prepare extruded sheets, foamed plastic articles and the tableware and drink containers for snack foods, the plastic ingredient is usually polypropylene. The ratio of the plastic ingredient and composition of the present invention can vary between 30~70:70~30 by weight according to the requirement of the final product The composition of the present invention can acutely improve the biodegradability of plastic articles. The final product prepared with the composition and plastic ingredient, such as polyethylene and polypropylene (including plastic films such as agricultural film or package, extruded sheets, foamed plastic articles, and the tableware and drink containers for snack foods,) can be fully biodegraded in 4-5 months under natural conditions (i.e., the final product is placed in the open air day and night).

The method and device to prepare the final product, which is prepared with the composition and plastic ingredient, such as polyethylene and polypropylene, are well known to those skilled in the art and are therefore not described in detail.

The present invention will be described in further detail with the following examples, which should not be taken as a limitation of the invention. If it is not specified clearly, the quantity of the ingredients in the composition are by weight.

EXAMPLE 1

FIG. 1 shows the flow chart of the procedures for preparing the biodegradable composition for the preparation of tableware, drink containers, mulching film and packages of the present invention.

Sugar cane residue was soaked in a 0.8% by weight of sulfuric acid solution for 5 hours. The mixture was filtered to obtain a processed sugar cane residue, and then was dried to have a water content of less than 10% by weight. The mixture of 37 parts by weight of the obtained sugar cane residue, 3 parts by weight of starch, 25 parts by weight of light calcium carbonate, 5 parts by weight of sorbitol, 3 parts by weight of polyethylene, and 9 parts by weight of polypropylene was pulverized in a pulverizer to obtain a powder of the mixture having a grain size of larger than 70 mesh.

The powder of the mixture as obtained above was mixed with 4 parts by weight of the glycerine, 1 parts by weight of emulsified silane oil, 5 parts by weight of silane, 4 parts by weight of stearic acid, 4 parts by weight of iron stearate, and 60 ppm benzophenone homogeneously to obtain a mixture of the same. The obtained mixture was blended and extruded and pelleted in a double-screw extruder at a temperature of 170° C. to obtain a concentrate of the composition of the present invention. The obtained concentrate was mixed with polypropylene at a weight ratio of 50:50 homogeneously, and the mixture was molded in a mould for the preparation of table-ware. After being kept at a temperature of 35° C. in the mould for 2 hours, a table-ware having good biodegradability was obtained.

The tableware obtained above is capable of being fully biodegraded in 4-5 months under natural conditions (i.e., the open air day and night).

EXAMPLES 2-5

In a similar manner as described in Example 1, the biodegradable compositions for the preparation of tableware, mulching film and package of the present invention were prepared. The contents of the raw materials in theses examples are listed in the following Table.

|  | Example 2 | Example 3 | Example 4 | Example 5 |
| --- | --- | --- | --- | --- |
| Starch | 3 | 3 | 3 | 3 |
| Sorbitol | 4 | 4 | 5 | 4 |
| Sugar cane residue powder | 15 | — | — | 13 |
| Peanut shell powder | 18 | 15 | — | — |
| Powder of dry pine needle | — | 18 | — | — |
| Millet bran powder | 5 | 4 | 15 | — |
| Soybean shell powder | — | — | 10 | 10 |
| Rice husk powder | — | — | 13 | 15 |
| Light calcium carbonate | 27 | 27 | — | — |
| Heavy calcium carbonate | — | — | 26 | 26 |
| Stearic acid | 3 | 4 | 3 | 4 |
| iron stearate | 4 | 5 | 4 | 5 |
| Polyethylene | 3 | 3 | 4 | 3 |
| polypropylene | 9 | 8 | 8 | 9 |
| Glycerine | 4 | — | — | 4 |
| epoxidized soybean oil | — | 4 | 4 | — |
| Silane | 4 | 4 | 4 | 3 |
| Emulsified silicon oil | 1 | 1 | 1 | 1 |
| benzophenone | 60 ppm | 60 ppm | 60 ppm | 60 ppm |

The compositions obtained in Examples 2-5 were mixed with polypropylene or polyethylene respectively, and the obtained mixtures were used to prepare table-ware, mulching film and package by the technology known by the person skilled in the art, respectively.

The tableware, drink containers, mulching film and package obtained above are capable of being fully biodegraded in 4-5 months under natural conditions (i.e., in the open field day and night).

Below is a table showing the rate of length decrease of a sample mulching film made of the compositions of the Example 3 when the sample film is placed in the open filed day and night. The rate of length decrease indicates the levels of biodegradation of the sample film. The shape of the sample film is square, and the size is about 33 cm×33 cm.

|  | 1 month Later | 2 months Later | 3 months Later | 4 months Later | 5 months Later |
| --- | --- | --- | --- | --- | --- |
| Rate of Length Decrease in the Longitudinal Direction of the sample mulching film | 5% | 18% | 32% | 74% | 100% |
| Rate of Length Decrease in the Transversal Direction of the sample mulching film | 2% | 15% | 28% | 69% | 100% |

INDUSTRIAL APPLICABILITY

The composition of the present invention can be used to prepare various plastic articles, including various tablewares, snack containers, agricultural films, packages, extruded sheets and plastic packages. These articles are capable of being fully biodegraded in 4-5 months under natural conditions. Therefore, the environmental pollution caused by light plastic articles can be eliminated or greatly alleviated.

I claim:

1. A method for preparing a biodegradable composition for the preparation of table-ware, mulching film and package, the method comprising:
   (1) treating one or more plant wastes selected from the group consisting of sugar cane residue, peanut shell, dry pine needle, rice husk, millet bran and soybean shell soaked in a 0.2-1.0% by weight of sulfuric acid or hydrochloric acid solution for 2-10 hours to degrease and modify and to wash, and then drying the same to let it have a water content of less than 10%; mixing the obtained plant wastes with starch, sorbitol, polypropylene, and polyethylene, and pulverizing the obtained mixture to obtain a powder with a particle size of larger than 70 mesh; mixing the obtained powder with calcium carbonate, stearic acid, stearate, coupling agent, defoamer, glycerine or epoxidized soybean oil and photosensitizer homogeneously; and (2) blending the mixture obtained in step (1) in a double-screw extruder at a temperature of 160-180° C. to obtain the biodegradable composition which comprises 2-6% by weight of starch, 35-45% by weight of plant wastes, 20-30% by weight of calcium carbonate; 2-7% by weight of sorbitol, 7-13% by weight of polypropylene, 2-5% by weight of polyethylene, 2-6% by weight of coupling agent, 1-2% by weight of defoamer, 2-5% by weight of stearic acid, 2-6% by weight of stearate, 3-6% by weight of glycerine or epoxidized soybean oil, and 60-100 ppm photosensitizer.

2. The method according claim 1, wherein the biodegradable composition comprises: 3-5% by weight of starch, 35-40% by weight of plant wastes, 20-30% by weight of calcium carbonate, 4-6% by weight of sorbitol, 8-11% by weight of polypropylene, 3-4% by weight of polyethylene, 3-5% by weight of coupling agent, 1-2% by weight of defoamer, 3-4% by weight of stearic acid, 3-5% by weight of stearate, 3-5% by weight of glycerine or epoxidized soybean oil, and 60-100 ppm photosensitizer.

3. The method according claim 1, wherein the biodegradable composition comprises: 3% by weight of starch, 37% by weight of plant wastes, 25% by weight of calcium carbonate, 5% by weight of sorbitol, 9% by weight of polypropylene, 3% by weight of polyethylene, 5% by weight of coupling agent, 4% by weight of stearic acid, 4% by weight of stearate, 1% by weight of defoamer, 4% by weight of glycerine or epoxidized soybean oil and 60 ppm photosensitizer.

4. The method according claim 1, wherein the starch is at least one selected from the groups consisting of corn starch, potato starch, ipomoea batatas starch, cassaya starch and a modified starch thereof with a grain size of larger than 70 mesh.

5. The method according claim 1, wherein the calcium carbonate is light or heavy calcium carbonate with a grain size of larger than 70 mesh.

6. The method according claim 1, wherein the coupling agent is silane.

7. The method according claim 1, wherein the stearate is iron stearate, magnesium stearate or calcium stearate.

8. The method according claim 1, wherein the stearate is iron stearate.

9. The method according claim 1, wherein the photosensitizer is benzophenone.

10. The method according claim 1, wherein the defoamer is emulsified silicone oil.

* * * * *